Nov. 24, 1931.   J. J. ENZLER   1,833,357
FINGER EXERCISER
Filed Nov. 20, 1929   2 Sheets-Sheet 1

Jack John Enzler
Inventor
Attorney
Thomas Bilyeu

Nov. 24, 1931.  J. J. ENZLER  1,833,357
FINGER EXERCISER
Filed Nov. 20, 1929   2 Sheets-Sheet 2

Jack John Enzler
Inventor
Attorney

Patented Nov. 24, 1931

1,833,357

UNITED STATES PATENT OFFICE

JACK JOHN ENZLER, OF PORTLAND, OREGON

FINGER EXERCISER

Application filed November 20, 1929. Serial No. 408,574.

My invention is intended for use by musicians, musical students, typists and others who desire intensified exercises of the digits of the hand. The same may be utilized by invalids or those who desire or require the exercising of the joints, muscles and nerves of the hand.

A further object of my invention resides in a structure through the use of which rapid exercising of the hand structure may be obtained. The device may be utilized through the selection of the different speeds for imparting the desired speed in the exercising to accomplish the desired results.

I have found that great benefits are imparted to typewriter students also in the exercising of the hand structure. Heretofore it has been the general custom to obtain speed in exercising by experiencing long, laborious and tedious development through the use of scale practises on the piano and in the writing of phrases and sentences by typewriting students. Through the use of my device, it is possible to obtain exercises both in speed and pressure through the use of a simplified, portable structure that is adapted to manipulate the hand structure at the desired speed that the student or teacher desires, to accomplish the purpose intended and at the same time to develop the desired pressure as well.

A further object of my invention resides in a structure that is adapted for being inclined at the desired angle in order that the finger exercises may be carried on for accomplishing the best results for the purposes intended.

A further object of my invention consists in providing a table upon which the forearm, wrist and the palm of the hand may come to rest and in having an exerciser for each finger or each digit of the hand simultaneously each of which may be exercised as individual units and each of which may have a movement imparted thereto commensurate with its length.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings.

Like reference characters refer to like parts throughout the several views.

Figure 1:
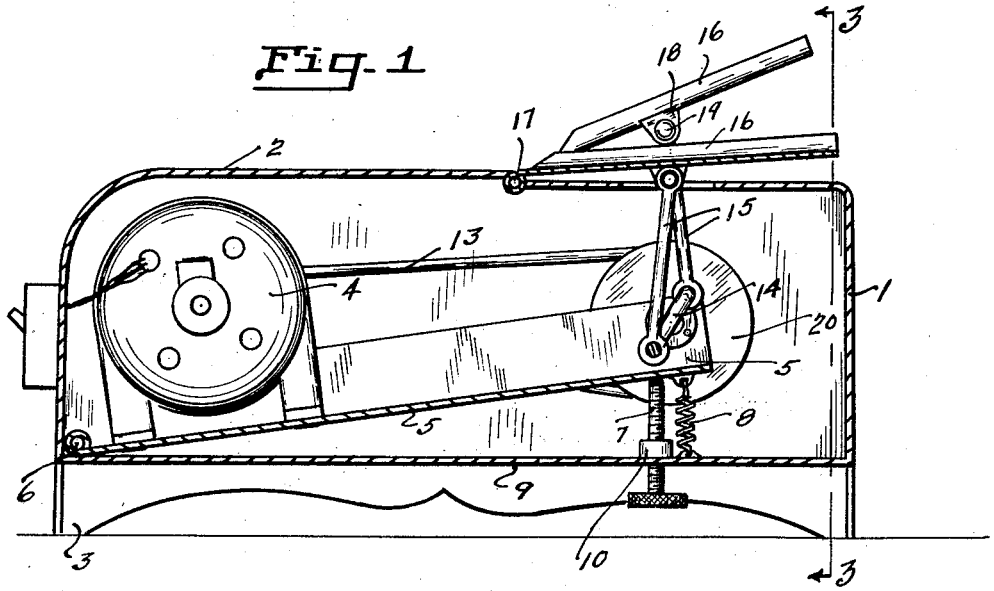
Fig. 1 is a sectional, side view of the assembled device.
Figure 2:
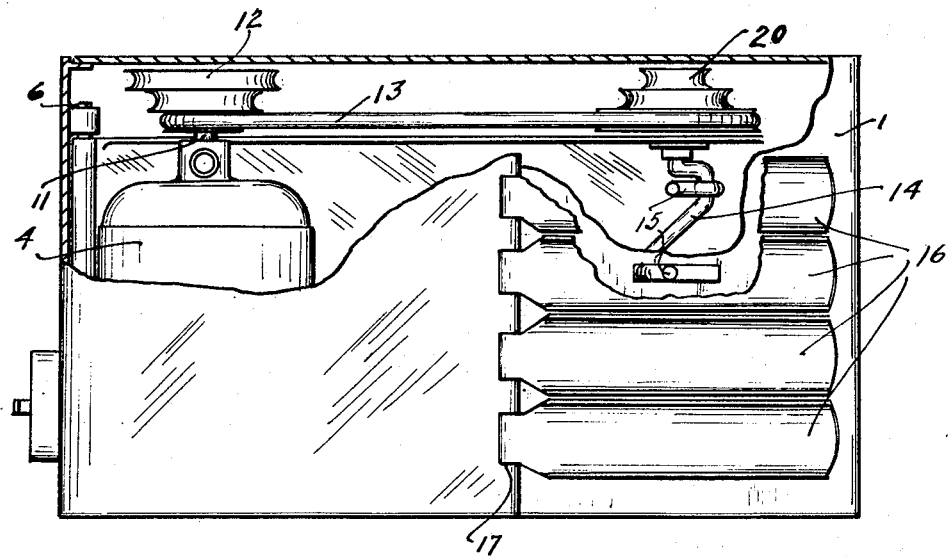
Fig. 2 is a top, plan view, partially in section, of the assembled device.
Figure 3:
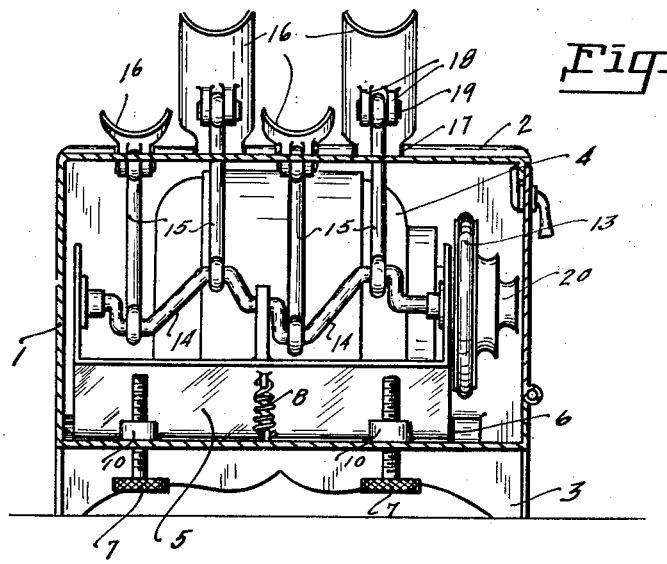
Fig. 3 is a sectional, end view of the assembled device, the same being taken on line 3—3 of Fig. 1 looking in the direction indicated.
Figure 4:
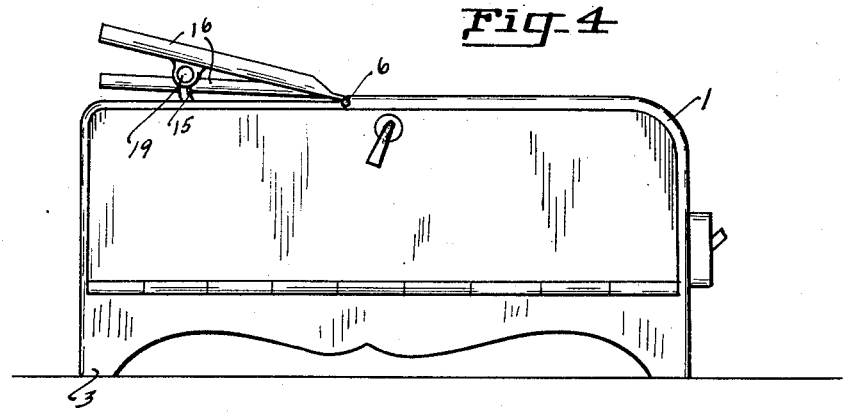
Fig. 4 is a side, view of the assembled device.
Figure 5:
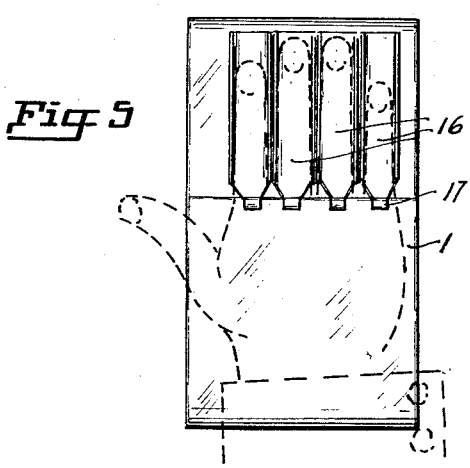
Fig. 5 is a top, plan view of the assembled device illustrating the hand to be exercised in place and position upon the same.

I preferably form my device of a metallic body element 1, having a table 2 disposed at the rear top portion upon which the forearm, wrist and palm of the hand may come to rest during the use of the device. Feet 3 are disposed at each corner of the base for supporting the base upon a table or other suitable supporting medium. The intention is to form the device in a shape and manner that will make it portable in order that it may be used at any desired location or may be moved from place to place by teachers, so that the same may be carried to the student by the teacher and be used by attaching the same to any suitable source of power, as to the electric light current disposed within the office, school, hospital or other place of use. I place within the case a suitable prime mover as an electric motor 4. The motor is mounted within the case upon an adjustable platform 5 that is mounted upon one end as by being hingedly secured to a journal pin 6 that is mounted within suitable bearings within the frame. The adjustable base 5 normally rests upon adjusting screws 7. The base 5 is held in normal contact with the adjustable screws by a reacting element as a spring 8. The adjusting screws 7 are in threaded relationship with the diaphragm 9 disposed longitudinally of the frame. Each of the screws passes through a threaded boss 10 secured to the diaphragm 9. The armature shaft 11 has directly secured thereto a stepped or cone pulley 12 about which the driving belt or chain 13 may be trained. A crank shaft 14 is journaled within suitable bearings disposed upon the diaphragm and a plurality of connecting rods 15 are secured to the shaft 14. A plurality of exercisers 16 are preferably made semi-circular in cross-sectional area, as illustrated in Fig. 3 and each of the finger exercisers has a pair of downwardly extending legs 18 through which a wrist pin 19 passes. The wrist pin passes through the upper end of the connecting rod 15 so that a working relationship is maintained between the finger exerciser element 16 and the crank. A cone pulley 20 is also mounted upon the crank 14, the same being in registerable alignment with the cone pulley 12 so that with the shifting of the belt, or the driving element 13, the desired speed will be obtained. If it is desired to have the exerciser elements maintained at an angle to that of the table 2, the supporting base 5 may be adjusted to the desired position thereby raising or lowering the crank relative to the base 5 to which the same is journaled.

Figure 6:
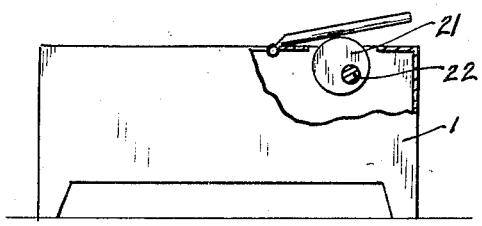
Fig. 6 is a side view, partially in section, of a modified form of the device.

I have shown in my device exercisers as being four in number, one each for the fingers of the hand, but a lesser or greater number may be provided as required, all falling within the scope of the invention. A modified form of my device may be made as illustrated in Fig. 6 wherein a plurality of eccentric disks 21 are mounted relative to the shaft 22, the same contacting with the under side of the finger exercising device and the contact being maintained between the finger exerciser and the disk by the pressure of the fingers upon finger receiving elements.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow.

What I claim is:

1. In a device of the class described, the combination of a metallic body element, a table disposed upon the upper rearward portion of the body element, a plurality of power actuated finger receiving elements manipulatively disposed at the forward upper end of the body element, variable electrically driven selective means for predetermining the rate of actuation of the finger receiving elements and means for predetermining the normal angle of repose of the finger receiving elements.

2. In a device of the class described, the combination of a body element, a table terminating a part of the upper surface of the body element, finger receiving elements hingedly disposed at the forward end of the body element, an adjustable platform hingedly disposed within the body element, a crank shaft journaled relative to the adjustable platform, connecting rods secured to the shaft and to the finger receiving elements for imparting movement to the finger receiving elements, manually manipulative means threadably disposed within the body element for adjusting the platform and varying the normal angle of the finger receiving elements relative to the table.

JACK JOHN ENZLER.